(12) United States Patent
He et al.

(10) Patent No.: US 6,704,055 B1
(45) Date of Patent: Mar. 9, 2004

(54) 3:2 PULL-DOWN FILM MODE DETECTION USING FUZZY LOGIC

(75) Inventors: Lei He, Fremont, CA (US); Hongmin Zhang, Santa Clara, CA (US)

(73) Assignee: Pixelworks, Inc., Tualatin, OR (US)

( * ) Notice: Subject to any disclaimer, the term of this patent is extended or adjusted under 35 U.S.C. 154(b) by 420 days.

(21) Appl. No.: 09/822,707

(22) Filed: Mar. 30, 2001

(51) Int. Cl.[7] .................................................. H04N 7/01
(52) U.S. Cl. ........................................ 348/449; 348/700
(58) Field of Search ................................ 348/558, 700, 348/449, 459, 441, 448, 526; 382/155–159, 224, 286

(56) References Cited

U.S. PATENT DOCUMENTS 5,835,163 A * 11/1998 Liou et al. .................. 348/700
6,385,245 B1 * 5/2002 De Haan et al. ........ 375/240.16

* cited by examiner

Primary Examiner—Victor R. Kostak
(74) Attorney, Agent, or Firm—Marger Johnson & McCollom, PC (57) ABSTRACT

Fuzzy logic based system and method for 3:2 pull-down film mode detection that detects whether a stream of NTSC video fields originate from film source via 3:2 pull-down technique. Fuzzy logic is used to generate a reference sequence of symbols from the stream of NTSC video fields. This reference sequence is adapted for indicating whether or not the video fields originate from film source.

15 Claims, 5 Drawing Sheets

```
For k ε {0, 5, ..., 5(m-1), 5m} wherein m is a positive integer,
{
If ( P[n +k], P[n-1 +k], P[n-2 +k], P[n-3 +k], P[n-4 +k] )
Is (  L  ,   H  ,   H  ,   H  ,   H  ), and
If Z[n-1+k], Z[n-2+k], Z[n-3+k], Z[n-4+k] have correct signs,
}

Then designate {F[j]} as 3:2 pull-downed video fields from film source.

3:2 PULL-DOWN FILM MODE DETECTION USING FUZZY LOGIC

BACKGROUND

Before being displayed by a progressive display device, NTSC video fields need to be deinterlaced first. As displayed on the progressive display device, the image quality of the deinterlaced fields depends on the type of deinterlacing process performed on the fields.

On the one hand, if the fields have originated from film frames by 3:2 pull-down, then deinteriacing the fields simply means merging fields that have originated from the same frame. As such, deinterlacing 3:2 pull-downed fields produces the best image quality on a progressive display device. However, on the other hand, if the fields are not generated by 3:2 pull-down but are deinterlaced as such, then the image quality of the progressively displayed images can be degraded by undesirable image saw-tooth.

BRIEF DESCRIPTION OF THE FIGURES

The accompanying drawings which are incorporated in and form a part of this specification, illustrate embodiments of the invention and together with the description, serve to explain the principles of the invention.

DETAILED DESCRIPTION

Reference is made in detail to the preferred embodiments of the invention. While the invention is described in conjunction with the preferred embodiments, the invention is not intended to be limited by these preferred embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, as is obvious to one ordinarily skilled in the art, the invention may be practiced without these specific details. In other instances, well-known methods, procedures, components, and circuits have not been described in detail so that aspects of the invention will not be obscured.

Figure 1:
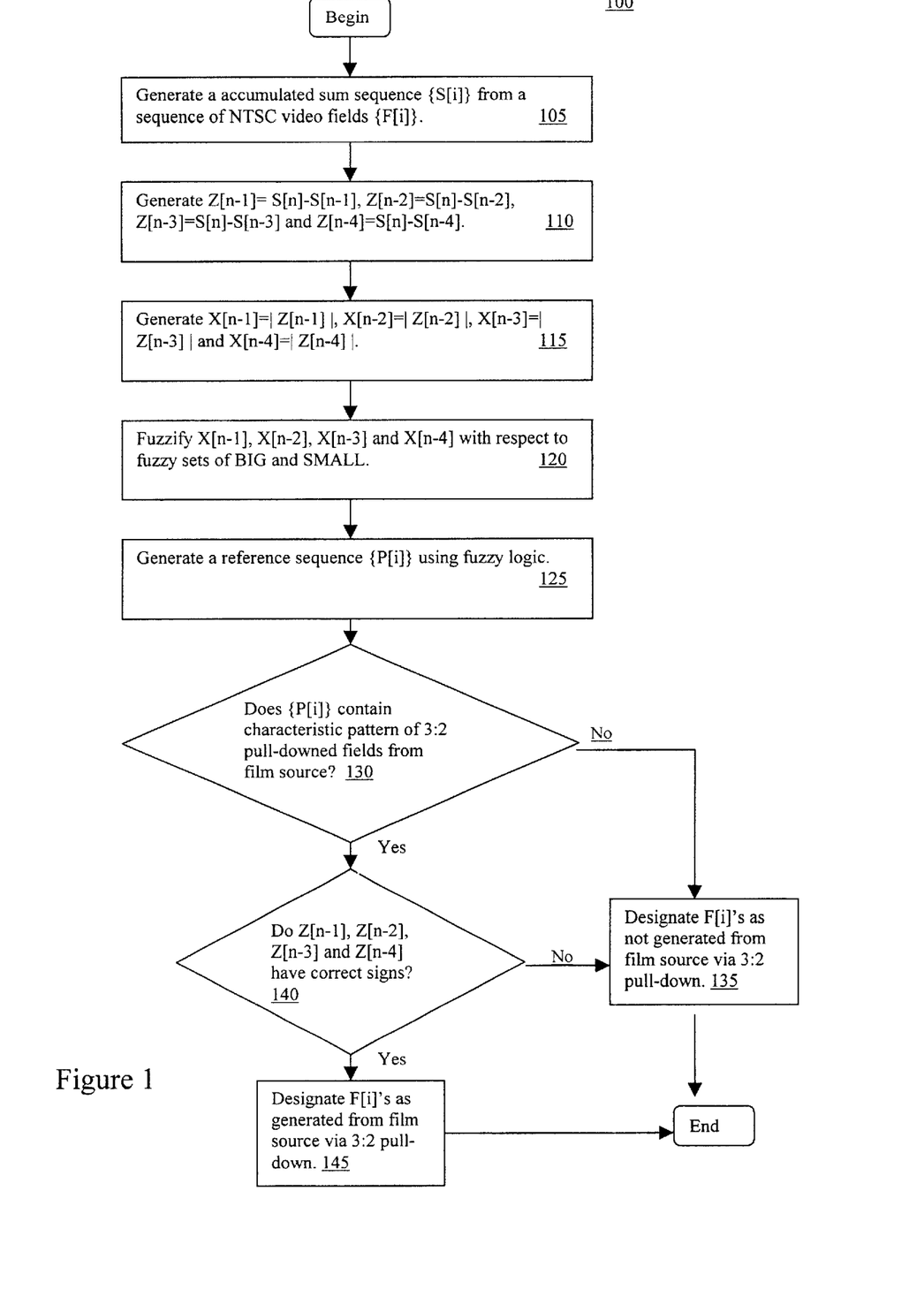
FIG. 1 is a flow chart comprising steps performed for 3:2 pull-down film mode detection in accordance with one embodiment of the invention.

Referring now to FIG. 1, a flow chart 100 is shown outlining steps performed for 3:2 pull-down film mode detection in accordance with one embodiment of the invention.

In step 105, a sequence of accumulated sums $$\{S[i]\}=\{\ldots, S[n-1], S[n], S[n+1], \ldots\}$$

is generated from a sequence of NTSC video fields $$\{F[i]\}=\{\ldots, F[n-1], F[n], F[n+1], \ldots\}.$$

Specifically, in step 105, a NTSC video field F[n] and F[n−2] (F[n−2] is two fields ahead of F[n]) are compared over a common designated set of pixel positions. More specifically, for each designated pixel position (i, j), the absolute value of the difference between the luma values Y[n] of F[n] and Y[n−2] of F[n−2] is generated. The difference between the luma values Y[n] and Y[n−2] at the pixel (i, j) is denoted a(i, j), with its absolute value denoted |a(i, j)|. Then, a sum S[n] of the absolute values over all the designated pixel positions is generated, wherein S[n]=Σ|a(i, j)|, where (i, j) varies over all pixel positions in the common designated set above.

In step 110, Z[n−1], Z[n−2], Z[n−3] and Z[n−4] are generated, wherein $$Z[n-1]=S[n]-S[n-1],$$

$$Z[n-2]=S[n]-S[n-2],$$

$$Z[n-3]=S[n]-S[n-3], \text{ and}$$

$$Z[n-4]=S[n]-S[n-4].$$

In step 115, X[n−1], X[n−2], X[n−3] and X[n−4] are generated, wherein $$X[n-1]=|Z[n-1]|,$$

$$X[n-2]=|Z[n-2]|,$$

$$X[n-3]=|Z[n-3]|, \text{ and}$$

$$X[n-4]=|Z[n-4]|.$$

In step 120, X[n−1], X[n−2], X[n−3] and X[n−4] are fuzzified with two fuzzy sets of "BIG" and "SMALL" by defining fuzzy membership functions of Big(X[.]) and Small (X[.]).

Specifically, Big(X[.]) assigns to every X[.] value its fuzzy membership in the fuzzy set BIG. In so doing, four numerical values of Big(X[n−1]), Big(X[n−2]), Big(X[n−3]) and Big(X[n−4]) are obtained. Also, Small(X[.]) assigns to every X[.] value its fuzzy membership in the fuzzy set SMALL. In so doing, four numerical values of Small(X[n−1]), Small(X[n−2]), Small(X[n−3]) and Small(X[n−4]) are obtained.

In step 125, a reference sequence of symbols $$\{P[i]\}=\{\ldots, P[n-1], P[n], P[n+1], \ldots\}$$

is generated in one-to-one correspondence with the sequence of accumulated sums $$\{S[i]\}=\{\ldots, S[n-1], S[n], S[n+1], \ldots\}.$$

Each P value P[i] can take on either an 'H' (High) or a 'L' (Low). Moreover, whether a P value such as P[i] takes on 'H' or 'L' is determined by applying a set of fuzzy inference rules. If a P value (e.g., P[n]) is assigned the symbol 'L' by these fuzzy inference rules, then X[n−1], X[n−2], X[n−3] and X[n−4] are classified as belonging to the fuzzy set of BIG. Otherwise, if a P value (e.g., P[n]) is assigned the symbol 'H' by these fuzzy inference rules, then at least one of X[n−1], X[n−2], X[n−3] and X[n−4] is classified as belonging to the fuzzy set of SMALL.

Specifically, these fuzzy inference rules can be summarized succinctly as follow:

If X[n−1] is BIG and X[n−2] is BIG and X[n−3] is BIG and X[n−4] is BIG, then P[n] is assigned 'L' to indicate that all of X[n−1], X[n−2], X[n−3] and X[n−4] are BIG. Otherwise, P[n] is assigned 'H' to indicate that at least one of X[n−1], X[n−2], X[n−3] and X[n−4] is SMALL.

These fuzzy inference rules are implemented by performing fuzzy inference algorithm. The fuzzy inference algorithm takes four X[.] values such as X[n−1], X[n−2], X[n−3] and X[n−4] as numerical inputs, and generates therefrom a numerical output g. Specifically, the fuzzy inference algorithm takes X[n−1], X[n−2], X[n−3] and X[n−4] and generates therefrom a collection of fuzzy subsets C[1], C[2], . . . and C[n], wherein each fuzzy subset is associated with one of the fuzzy inference rules. Then the fuzzy inference algorithm forms a fuzzy union set D of the fuzzy subsets C[1], C[2], . . . and C[n]. In turn, the fuzzy inference algorithm defuzzifies the fuzzy union set D to obtain the numerical output g. The numerical range of g is partitioned into two intervals, a Low interval and a High interval. If g falls within the Low interval, then P[n] is assigned the symbol of 'L'. Otherwise, if g falls within the High interval, then P[n] is assigned the symbol of 'H'.

As mentioned above, if a P value (e.g., P[n]) is assigned the symbol 'L' by these fuzzy inference rules (implemented through fuzzy inference algorithm), then this P value's corresponding S value (i.e., S[n]) is separated from the previous four S values (i.e., S[n−1], S[n−2], S[n−3] and S[n−4]) by big gaps (i.e., gap X[n−3] is BIG, gap X[n−2] is BIG, gap X[n−3] is BIG, and gap X[n−4] is BIG). Otherwise, if a P value (e.g., P[n]) is assigned the symbol 'H' by these fuzzy inference rules (implemented through fuzzy inference algorithm), then one or more of the gaps (i.e., gap X[n−1], gap X[n−2], gap X[n−3], and gap X[n−4])is SMALL.

As understood herein, the defuzzification is performed using the center-of-gravity defuzzification technique. However, in another embodiment, other type of defuzzification technique can be used.

In query step 130, a check is made to determine if the generated reference sequence {P[i]} exhibits a repeating pattern that characterizes 3:2 pull-downed fields.

Specifically, the repeating pattern that characterizes 3:2 pull-downed fields can be 'HHHHL', 'HHHLH', 'HHLHH', 'HLHHH', or 'LHHHH'. If none of these patterns is found to be repeating in the reference sequence, then the fields are not designated as 3:2 pull-downed fields. As such, step 135 is performed wherein these fields are designated as fields not generated from film source via 3:2 pull-down. If one of these patterns is found to be repeating at least m times (where m is a positive integer), then the fields are treated as possible candidates as 3:2 pull-downed fields. As such, an extra query step 140 is performed.

In query step 140, the signs of Z[n−1], Z[n−2], Z[n−3] and Z[n−4] are also used to rule out possible erroneous symbol assignment in the reference sequence {P[i]}. If there is symbol mis-assignment, then step 135 is performed. If there is no symbol mis-assignment, then step 145 is performed.

In step 135, these fields are designated as fields not generated from film source via 3:2 pull-down process.

In step 145, these fields are designated as fields generated from film source via 3:2 pull-down process.

Figure 2:
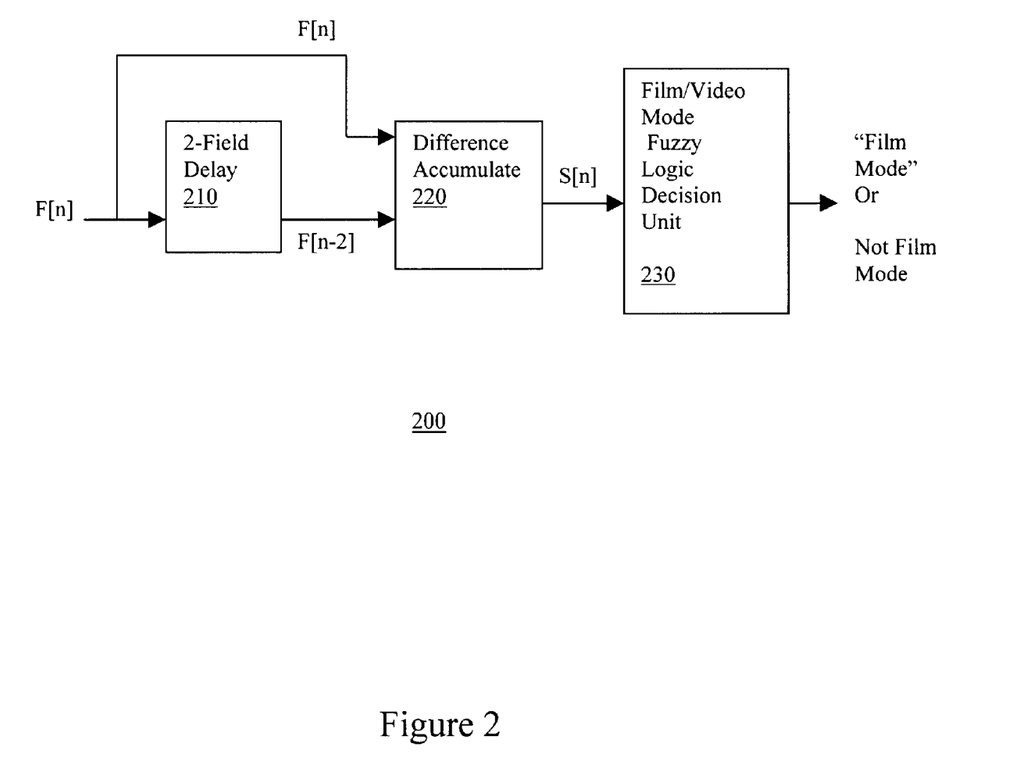
FIG. 2 shows a system diagram for 3:2 pull-down film mode detection in accordance with one embodiment of the invention.

Referring now to FIG. 2, a system 200 is shown for 3:2 pull-down film mode detection in accordance with one embodiment of the invention. System 200 is adapted to detect the NTSC video fields that have been generated by 3:2 pull-down from film frames. Moreover, unless their 3:2 pull-downed origin can be ascertained, these fields are not designated by system 200 as 3:2 pull-downed fields.

System 200 comprises a two-field delay 210, a difference accumulate 220 and a film/video mode decision unit 230.

Specifically, two-field delay 210 receives a first video field stream that is a NTSC video field stream, then generates therefrom a second field stream that is a two-field delay version of the first video field stream. Difference accumulate 220 receives both the first and the second field streams, then generates therefrom a stream of accumulated field differences between the first and the second field streams. Decision unit 230 receives this difference stream and then determines if the NTSC video fields have been generated by 3:2 pull-down from film frames. As will be explained, decision unit 230 incorporates fuzzy logic to make this determination.

Figure 3:
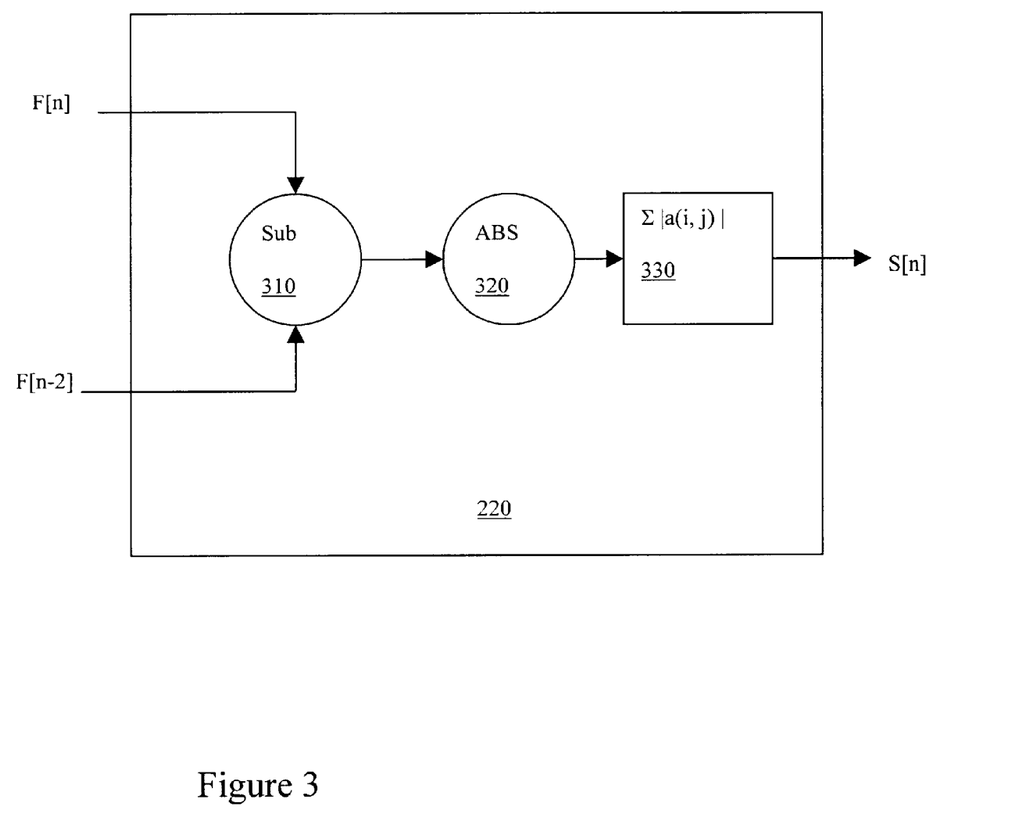
FIG. 3 shows a block diagram for generating the accumulated difference between two fields in accordance with one embodiment of the invention.

Referring now to FIG. 3, difference accumulate unit 220 (previously from FIG. 2) is shown in more details in accordance with one embodiment of the invention. As described above, unit 220 is adapted for generating the accumulated difference between two fields that are one field apart (e.g., F[n] and F[n−2]).

Unit 220 comprises a subtraction unit 310, an absolute value unit 320 and a summing unit 330.

Subtraction unit 310 receives both a field F[n] from the first stream and a field F[n−2] from the two-field delay stream, wherein F[n−2] is positioned 2 fields ahead of F[n] within the incoming field stream. Specifically, a "common detection area" (a set of pixel positions at which the luma values Y[n] and Y[n−2] are subtracted from each other) is first designated for the two incoming fields. Specifically, at each pixel position (i, j) of the common detection area, the luma value Y[n] of the field F[n] at pixel (i, j) is subtracted from the luma value Y[n−2] at pixel (i, j) of the field F[n−2]. As a result, the luma difference a(i, j) at pixel (i, j) is generated.

Absolute value unit 320 receives the a(i, j)'s and generates therefrom their absolute values: |a(i, j)|'s.

Summing unit 330 receives |a(i, j)|'s and generates therefrom their sum $S[n]=\Sigma|a(i, j)|$, where the sum is taken over all (i, j)'s within the designated common pixel positions of both fields.

Continuing with FIG. 3, unit 220 over time generates as its output a stream of S values: { . . . S[n−1], S[n], S[n+1], . . . }. Specifically, unit 220 receives the next pair of fields F[n+1] and F[n−1] and generates therefrom S[n+1]. Similarly, unit 220 receives the next pair of fields F[n+2] and F[n] and generates therefrom S[n+2], and so on.

Figure 4:
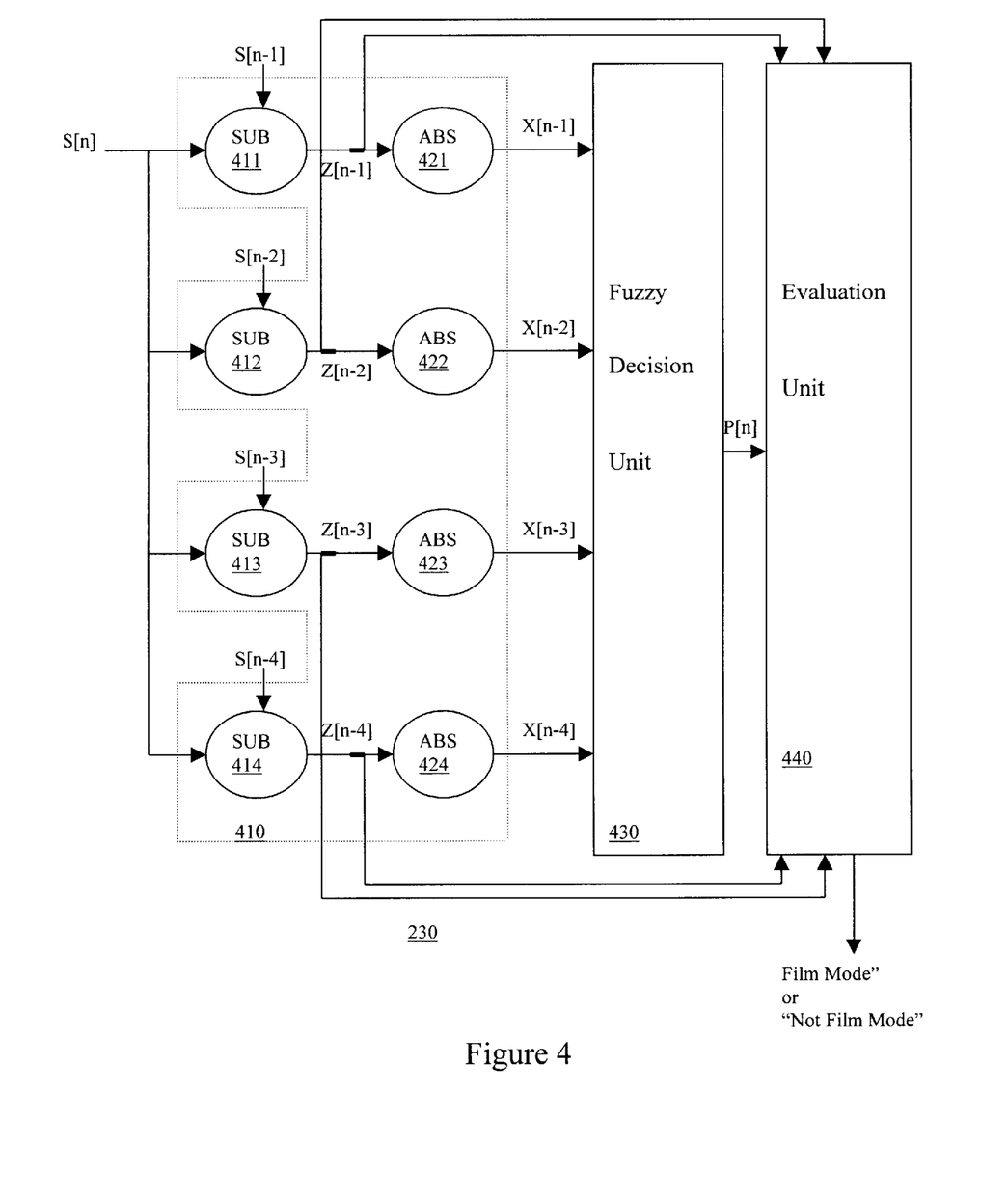
FIG. 4 shows a block diagram for generating a reference sequence of symbols that is used for detecting 3:2 pull-down film mode in accordance with one embodiment of the invention.

Referring now to FIG. 4, decision unit 230 (previously from FIG. 2) is shown in more details in accordance with one embodiment of the invention. Decision unit 230 uses fuzzy logic for generating a reference sequence of symbols {P[i]}, wherein each symbol can either be an 'H' (High) or a 'L' (Low). This reference sequence is adapted as a determining factor for detecting 3:2 pull-down film origin of the NTSC video fields.

Decision unit 230 comprises a relative value unit 410, a fuzzy logic decision unit 430 and a decision unit 440. Relative value unit 410 further comprises four subtraction units 411–414 and four absolute value units 421–424. Relative value unit 410 provides data for fuzzy logic decision unit 420 to generate the reference sequence to be provided to film/video mode evaluation unit 430.

Specifically, relative value unit 410 can receive five S values as inputs. For example, as shown, these S values can be S[n], S[n−1], S[n−2], S[n−3] and S[n−4]. In turn, relative value unit 410 generates therefrom four outputs X[n−1], X[n−2], X[n−3] and X[n−4] that indicate respectively the relative differences between S[n] and the other four S values. More specifically, as shown, X[n−1] is the absolute value of the difference Z[n−1] between S[n] and S[n−1]; X[n−2] is the absolute value of the difference Z[n−2] between S[n] and S[n−2]; X[n−3] is the absolute value of the difference Z[n−3] between S[n] and S[n−3]; and X[n−4] is the absolute value of the difference Z[n−4] between S[n] and S[n−4]. The differences Z[n−1], Z[n−2], Z[n−3] and Z[n−4] are provided to unit 440.

Continuing with FIG. 4, fuzzy decision unit 430 receives X[n−1], X[n−2], X[n−3] and X[n−4] and applies fuzzy logic to generate therefrom a symbol P[n] belonging to the reference sequence {P[i]}. P[n] can take on either the symbol of 'H' or the symbol of 'L'. Whether P[n] is assigned 'H' or 'L' is determined by fuzzy logic as explained in the discussion with respect to step 125 of FIG. 1. Each symbol in the reference sequence is assigned to an S value in order to characterize the sizes of the four gaps (i.e., X[n−1], X[n−2], X[n−3] and X[n−4]) between the S value (i.e., S[n]) and its previous four S values (i.e., S[n−1], S[n−2], S[n−3] and S[n−4]). For example, the nth symbol (P[n]) is assigned to the nth S value (S[n]). Similarly, the (n+1)th symbol (P[n+1]) is assigned to the (n+1)th S value (S[n+1]), and so on. Moreover, if P[n] is 'L', then the gap sizes (i.e., X[n−1], X[n−2], X[n−3] and X[n−4]) are characterized as BIG by the fuzzy inference rules implemented in the present embodiment. Otherwise, if P[n] is 'H', then one or more of the gap sizes (i.e., X[n−1], X[n−2], X[n−3] and X[n−4]) are characterized as SMALL by the fuzzy inference rules implemented in the present embodiment.

Referring still to FIG. 4, evaluation unit 440 receives the reference sequence {P[i]}, Z[n−1], Z[n−2], Z[n−3] and Z[n−4], then determines therefrom whether or not to the fields are 3:2 pull-downed from film source. How decision unit 440 arrives at its determination is described in FIG. 5.

Figure 5:
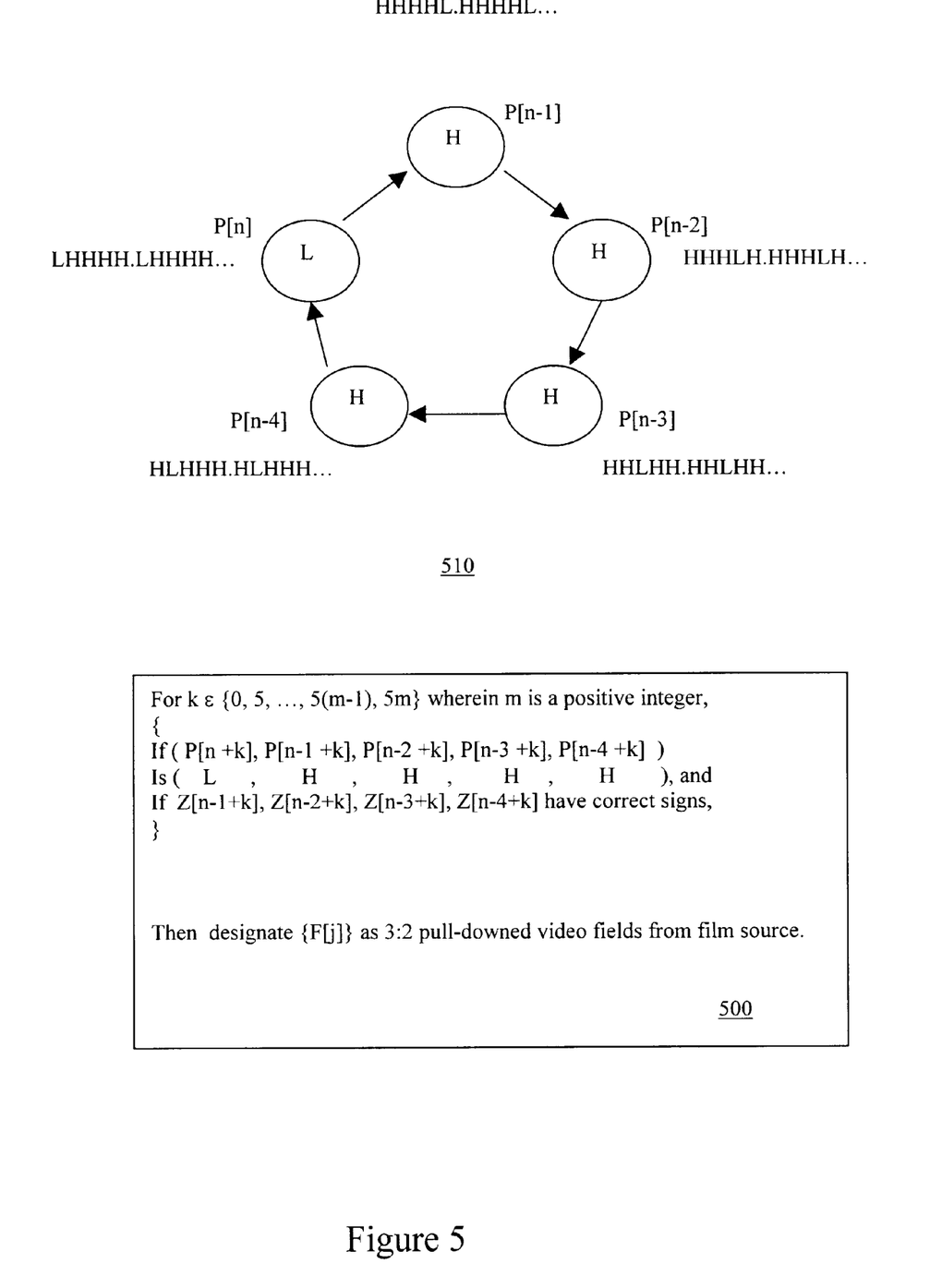
FIG. 5 shows a decision rule used to indicate the detection of the 3:2 pull-down film mode in accordance with one embodiment of the invention.

Referring now to FIG. 5 in view of FIG. 4, a decision rule 500 adapted to ascertain 3:2 pull-down origin of video fields is depicted in accordance with one embodiment of the invention. Specifically, decision rule 400 is depicted together with a cyclic pattern 510 that characterizes a sequence of 3:2 pull-downed fields.

The reference sequence {P[i]} is generated by fuzzy decision unit (see 430 of FIG. 4) for detecting 3:2 pull-downed fields. Specifically, if the fields have been generated by 3:2 pull-down from film frames, then the reference sequence generated by fuzzy decision unit 430 exhibits a repeating pattern 510 that characterizes 3:2 pull-downed fields. Specifically, within the reference sequence, a cyclic symbol pattern formed by repeating the pattern of 'HHHHL' can indicate 3:2 pull-downed fields.

However, as understood herein, a cyclic symbol pattern can start from any place of cyclic pattern 510. For example, in addition to 'HHHHL' above, each of the following four patterns might also be found repeated (in the reference sequence): 'HHHLH', 'HHLHH', 'HLHHH', and 'LHHHH'.

Furthermore, within evaluation unit 440, the signs of Z[n−1], Z[n−2], Z[n−3] and Z[n−4] are also used to rule out possible erroneous symbol assignment in {P[i]}. In so doing, evaluation unit 440 can avoid erroneously designating fields as 3:2 pull-downed fields from film source.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

What is claimed is:

1. A method for 3:2 pull-down film mode detection of a stream of NTSC video fields {F[j]}={ . . . F[n−2], F[n−1], F[n], . . . }, where n and j are integers, the method comprising:

a) generating from said {F[j]} a sequence {S[j], wherein S[n] in said sequence denotes an accumulated sum of absolute value of luma difference between two fields F[n] and F[n−2] over a common set of pixel positions;

b) generating from said {S[j]} a sequence {P[j]}={ . . . P[n−2], P[n−1], P[n], . . . }, whose elements are in one-to-one correspondence with the elements of said sequence {S[j]}, wherein an element P[n] is assigned a symbol from a two-symbol set by applying a set of fuzzy inference rules; and c) in response to said sequence {P[j]} having a pattern that characterizes a stream of 3:2 pull-downed fields, designating said stream {F[j]} as 3:2 pull-downed fields from film source;

where said two-symbol set is {L, H}, L representing a low state and H representing a high state, and where said fuzzy interference rules are:

with the sequence X[n−1]=|S[n]−S[n−1]|, X[n−2]=|S[n]−S[n−2]|, X[n−3]=|S[n]−S[n−3]|, X[n−4]=|S[n]−S[n−4]|, and with fuzzy sets of BIG and SMALL defined to characterize sizes of X[n−1], X[n−2], X[n−3] and X[n−4], if X[n−1] is BIG, and X[n−2] is BIG, and X[n−3] is BIG, and X[n−4] is BIG, then P[n] is assigned the symbol 'L';

otherwise, P[n] is assigned the symbol 'H'.

2. The method of claim 1, comprising:

performing symbol assignment to said element P[n] by performing a fuzzy logic interference algorithm to implement said set of fuzzy logic inference rules.

3. The method of claim 2, where said fuzzy logic inference algorithm comprises:

defining a fuzzy subset per each fuzzy logic inference rule of said set of fuzzy logic inference rules, thereby resulting in a plurality of fuzzy subsets;

forming a fuzzy union set of said plurality of fuzzy subsets; and defuzzifying said fuzzy union set by using a center of gravity defuzzification method to generate a value g adapted to determine symbol assignment of the element P[n].

4. The method of claim 1, where said pattern is selectable from a group consisting of field sequences:

LHHHH repeated m times in said sequence {P[j]};

HHHHL repeated m times in said sequence {P[j]};

HHHLH repeated m times in said sequence {P[j]};

HHLHH repeated m times in said sequence {P[j]}; and

HLHHH repeated m times in said sequence {P[j]};

where said m is a positive integer.

5. A method for 3:2 pull-down film mode detection of a stream of NTSC video fields {F[j]}={ . . . F[n−2], F[n−1], F[n], . . . }, where n and j are integers the method comprising:

a) generating from said {F[j]} a sequence {S[j]}, wherein S[n] in said sequence denotes an accumulated sum of absolute value of luma difference between two fields F[n] and F[n−2] over a common set of pixel positions;

b) generating from said {S[j]} a sequence {P[j]}={ . . . P[n−2], P[n−1], P[n], . . . }, whose elements are in one-to-one correspondence with the elements of said sequence {S[j]}, wherein an element P[n] is assigned a symbol from a two-symbol set by applying a set of fuzzy inference rules; and c) in response to said sequence {P[j]} having a pattern that characterizes a stream of 3:2 pull-downed fields, designating said stream {F[j]} as 3:2 pull-downed fields from film source;

where in said c), the signs of the sequence Z[n−1]=(S[n]−S[n−1]), Z[n−2]=(S[n]−S[n−2]), Z[n−3]=(S[n]−S[n−3]) and Z[n−4]=(S[n]−S[n−4]) are adapted as a criteria to rule out erroneously designating said stream {F[j]} as 3:2 pull-downed fields from film source.

6. A method for 3:2 pull-down film mode detection of a stream of NTSC video fields {F[j]}={ . . . F[n−2], F[n−1], F[n], . . . }, where n and j are integers, said method comprising:

a) generating from said stream {F[j]} a sequence {S[j]}={ . . . S[n−2], S[n−1], S[n], . . . }, wherein S[n] in said sequence denotes an accumulated sum of absolute value of luma difference between two fields F[n] and F[n−2] over a common set of pixel positions;

b) for said S[n], characterizing the sizes of the sequence X[n−1]=|S[n]−S[n−1]|, X[n−2]=|S[n]−S[n−2]|, X[n−3]=|S[n]−S[n−3]|, X[n−4]=|S[n]−S[n−4]| with their fuzzy memberships in fuzzy logic sets;

c) generating from said sequence {S[j]} a reference sequence P[j]}={ . . . P[n−2], P[n−1], P[n], . . . }, whose elements correspond one-to-one to elements of {S[j]}, wherein the element P[n] corresponding to said S[n] is assigned a symbol from a set having two symbols by applying fuzzy inference rules, and wherein said element P[n] is adapted to summarize the fuzzy set memberships of said sequence X[n−1], X[n−2], X[n−3] and X[n−4] in said fizzy sets; and d) in response to said sequence {P[j]} containing a pattern that characterizes a stream of 3:2 pull-downed fields, designating said {F[j]} as a set of 3:2 pull-downed fields from film source;

where the set of two symbols is {L, H}, where the symbol L is for a low state and the symbol H is for a high state, where said fuzzy sets are defined as BIG and SMALL, and where said set of fuzzy inference rules are:

if X[n−1] is BIG, and X[n−2] is BIG, and X[n−3] is BIG, and X[n−4] is BIG, then P[n] is assigned the symbol 'L';

otherwise, P[n] is assigned the symbol 'H'.

7. The method of claim 6, comprising:

performing symbol assignment to said element P[n] by performing fuzzy logic inference algorithm to implement said set of fuzzy logic inference rules.

8. The method of claim 7, where said fuzzy logic inference algorithm comprises:

defining a fuzzy subset per each fuzzy logic inference rule of said set of fuzzy logic inference rules, thereby resulting in a plurality of fuzzy subsets;

forming a fuzzy union set of said plurality of fuzzy subsets; and defuzzifying said fuzzy union set by using a center of gravity defuzzification method to generate a value g adapted to determine symbol assignment of said P[n].

9. The method of claim 6, where said pattern is selectable from a group consisted of the field sequences:

LHHHH repeated m times in said {P[j]};

HHHHL repeated m times in said {P[j]};

HHHLH repeated m times in said {P[j]};

HHLHH repeated m times in said {P[j]}; and

HLHHH repeated m times in said {P[j]};

where said m is a positive integer.

10. A method for 3:2 pull-down film mode detection of a stream of NTSC video fields {F[j]}={ . . . F[n−2], F[n−1], F[n], . . . }, where n and j are integers, the method comprising:

a) generating from said stream {F[j]} a sequence {S[j]}={ . . . S[n−2], S[n−1], S[n], . . . }, wherein S[n] in said sequence denotes an accumulated sum of absolute value of luma difference between two fields F[n] and F[n−2] over a common set of pixel positions;

b) for said S[n], characterizing the sizes of the sequence X[n−1]=|S[n]−S[n−1]|, X[n−2]=|S[n]−S[n−2]|, X[n−3]=|S[n]−S[n−3]|, X[n−4]=|S[n]−S[n−4]| with their fuzzy memberships in fuzzy logic sets;

c) generating from said sequence {S[j]} a reference sequence {P[j]}={ . . . P[n−2], P[n−1], P[n], . . . }, whose elements correspond one-to-one to elements of {S[j]}, wherein the element P[n] corresponding to said S[n] is assigned a symbol from a set having two symbols by applying fuzzy inference rules, and wherein said element P[n] is adapted to summarize the fuzzy set memberships of said sequence X[n−1], X[n−2], X[n−3] and X[n−4] in said fuzzy sets; and d) in response to said sequence {P[j]} containing a pattern that characterizes a stream of 3:2 pull-downed fields, designating said {F[j]} as a set of 3:2 pull-downed fields from film source;

where in said c), the signs of the sequence Z[n−1]=(S[n]−S[n−1]), Z[n−2]=(S[n]−S[n−2]), Z[n−3]=(S[n]−S[n−3]) and Z[n−4]=(S[n]−S[n−4]) are adapted as a criteria to rule out erroneously designating said stream {F[j]} as 3:2 pull-downed fields from film source.

11. A system for 3:2 pull-down film mode detection of a stream of NTSC stream of video fields {F[j]}={ . . . F[n−2], F[n−1], F[n], . . . }, where n and j are integers, said system comprising:

a difference accumulate unit adapted for generating from said stream {F[n]} a sequence {S[j]}={ . . . S[n−2], S[n−1], S[n], . . . }, where S[n] denotes an accumulation sum of absolute value of luma difference between two fields F[n] and F[n−2] over a common set of pixel positions;

a fuzzy logic decision unit adapted for generating from said {S[j]} a sequence {P[j]}={ . . . P[n−2], P[n−1], P[n], . . . }, whose elements are in one-to-one correspondence with the elements of said sequence {S[j]}, where the element P[n] corresponding to said element S[n] is assigned a symbol from a set of two symbols by applying a set of fuzzy inference rules; and a decision unit adapted for designating said {F[j]} by said {P[j]} as 3:2 pull-downed fields in response to said {P[j]} having a pattern that characterizes a stream of 3:2 pull-downed fields from film source;

where set of two symbols is {L, H}, where the symbol L is low and the symbol H is high; and where the set of fuzzy inference rules are:

with fuzzy sets of BIG and SMALL defined to characterize sizes of the sequence X[n−1], X[n−2], X[n−

3] and X[n−4] by fuzzy memberships of X[n−1], X[n−2], X[n−3] and X[n−4] in said fuzzy sets BIG and SMALL, where X[n−1]=|S[n]−S[n−1]|, X[n−2]=|S[n]−S[n−2]|, X[n−3]=|S[n]−S[n−3]|, X[n−4]=|S[n]−S[n−4]|, if X[n−1]| is BIG, and X[n−2] is BIG, and X[n−3] is BIG, and X[n−4] is BIG, then P[n] is assigned the symbol 'L';

otherwise, P[n] is assigned the symbol 'H'.

12. The system of claim 11, where said fuzzy logic decision unit is adapted to perform symbol assignment to said element P[n] by performing fuzzy logic inference algorithm to implement said set of fuzzy logic inference rules.

13. The system of claim 12 where said fuzzy logic inference algorithm performed by said fuzzy logic decision unit comprises:

defining a fuzzy subset per each fuzzy logic inference rule of said set of fuzzy logic inference rules, thereby resulting in a plurality of fuzzy subsets;

forming a fuzzy union set of said plurality of fuzzy subsets; and defuzzifying said fuzzy union set by using a center of gravity defuzzification method to generate a value g adapted to determine symbol assignment of said element P[n].

14. The system of claim 11, where said pattern is selectable from a group consisted of the field sequences:

LHHHH repeated m times in said {P[j]};

HHHHL repeated m times in said {P[j]};

HHHLH repeated m times in said {P[j]};

HHLHH repeated m times in said {P[j]}; and

HLHHH repeated m times in said {P[j]};

where said m is a positive integer.

15. A system for 3:2 pull-down film mode detection of a stream of NTSC stream of video fields {F[j]}={ . . . F[n−2], F[n−1], F[n], . . . }, where n and j are integers, said system comprising:

a difference accumulate unit adapted for generating from said stream {F[n]} a sequence {S[j]}={ . . . S[n−2], S[n−1], S[n], . . . }, where S[n] denotes an accumulation sum of absolute value of luma difference between two fields F[n] and F[n−2] over a common set of pixel positions;

a fuzzy logic decision unit adapted for generating from said {S[j]} a sequence {P[j]}={ . . . P[n−2], P[n−1], P[n], . . . }, whose elements are in one-to-one correspondence with the elements of said sequence {S[j]}, where the element P[n] corresponding to said element S[n] is assigned a symbol from a set of two symbols by applying a set of fuzzy inference rules; and a decision unit adapted for designating said {F[j]} by said {P[j]} as 3:2 pull-downed fields in response to said {P[j]} having a pattern that characterizes a stream of 3:2 pull-downed fields from film source;

where said decision unit uses the signs of the sequence Z[n−1]=(S[n]−S[n−1]), Z[n−2]=(S[n]−S[n−2]), Z[n−3]=(S[n]−S[n−3]) and Z[n−4]=(S[n]−S[n−4]) as a criteria to rule out erroneously designating said stream {F[j]} as 3:2 pull-downed fields from film source.

* * * * *

UNITED STATES PATENT AND TRADEMARK OFFICE
CERTIFICATE OF CORRECTION

PATENT NO.    : 6,704,055 B1
DATED         : March 9, 2004
INVENTOR(S)   : He et al.

It is certified that error appears in the above-identified patent and that said Letters Patent is hereby corrected as shown below:

Column 1,
Line 13, "the deinteriacing the" to -- the deinterlacing the --.

Column 3,
Line 31, "gap X[n-3] is" should read -- gap X[n-1] is --.

Column 6,
Line 14, "sequence {S[j], wherein" should read -- sequence {S[j]}, wherein --.
Line 36, "X[n-2]is" should read -- X[n-2] is --.
Line 66, "integers the method" should read -- integers, the method --.

Column 7,
Line 23, "{S[j]}=5...S[n-2]," should read -- {S[j]}= {...S[n-2], --.
Line 33, "P[j]} =" should read -- {P[j]} = --.
Line 40, "said fizzy sets;" should read -- said fuzzy sets; --.

Column 8,
Line 63, "where set of two" should read -- where said set of two --.

Column 9,
Line 6, "if X[n-1]| is BIG," should read -- if X[n-1] is BIG, --.
Line 28, "of claim 11, where" should read -- of claim 11 where --.

Column 10,
Line 13, "F[n-2]over" should read -- F[n-2] over --.

Signed and Sealed this

Twenty-first Day of June, 2005

JON W. DUDAS
*Director of the United States Patent and Trademark Office*